US005732262A

United States Patent [19]

Gillespie et al.

[11] Patent Number: 5,732,262
[45] Date of Patent: Mar. 24, 1998

[54] DATABASE DEFINITION LANGUAGE GENERATOR

[75] Inventors: Horace L. Gillespie, Friendswood; Margaret M. Powers, Grapevine, both of Tex.

[73] Assignee: International Business Machines Corporation, Armonk, N.Y.

[21] Appl. No.: 611,553

[22] Filed: Mar. 6, 1996

Related U.S. Application Data

[63] Continuation of Ser. No. 189,450, Jan. 31, 1994, abandoned.

[51] Int. Cl.[6] .................................................. G06F 17/30
[52] U.S. Cl. ............................ 395/613; 395/703; 395/701
[58] Field of Search .................................. 395/601, 602, 395/603, 604, 605, 708, 703–707, 613

[56] References Cited

U.S. PATENT DOCUMENTS

| | | | |
|---|---|---|---|
| 4,858,146 | 8/1989 | Shebini | 364/512 |
| 4,862,392 | 8/1989 | Steiner | 364/522 |
| 4,894,829 | 1/1990 | Monie et al. | 371/20.1 |
| 4,928,233 | 5/1990 | Millis et al. | 364/522 |
| 4,945,499 | 7/1990 | Asari et al. | 364/521 |
| 4,961,139 | 10/1990 | Hong et al. | 364/DIG. 7 |
| 4,967,375 | 10/1990 | Pelham et al. | 364/518 |
| 5,021,992 | 6/1991 | Kondo | 364/DIG. 2 |
| 5,197,005 | 3/1993 | Shwartz et al. | 395/602 |
| 5,295,222 | 3/1994 | Wadhwa et al. | 395/1 |
| 5,297,279 | 3/1994 | Bannon et al. | 395/600 |
| 5,369,761 | 11/1994 | Conley et al. | 395/600 |
| 5,375,237 | 12/1994 | Tanaka et al. | 395/650 |
| 5,450,581 | 9/1995 | Bergen et al. | 395/600 |
| 5,590,319 | 12/1996 | Cohen et al. | 395/604 |

OTHER PUBLICATIONS

"Unifying data model in the UN" (Logic Works' Erwin CASE software).
Maurice Frank, DBMS, v6, n13, p. 70(3), Dec., 1993.
"Design better applications with SilverRun", by Robert Gryphon, Data Based Advisor, v12, n1, p. 103(4), Jan., 1994.
"Repository Technology: Case Tools"; Bloor, Robin; DBMS v4, n13, p. 17(2), Dec. 1991.
Crack in the foundation (Abstract); Johnston, Tom; Database Programming & Design, v4, n10, p. 50(4); Oct., 1991.

*Primary Examiner*—Thomas G. Black
*Assistant Examiner*—Hosain T. Alaim
*Attorney, Agent, or Firm*—Whitham, Curtis, Whitham & McGinn; David J. Kappos

[57] ABSTRACT

A database definition language generator which can read input from database design document which exists in a structured file format and using this information can generate the database definition language for a specified database management system.

4 Claims, 3 Drawing Sheets

DATABASE DEFINITION LANGUAGE GENERATOR

This application is a continuation of application Ser. No. 08/189,450 filed on Jan. 31, 1994 now abandoned.

BACKGROUND OF THE INVENTION

1. Field of the Invention

The present invention generally relates to database processing systems which generate database definition language programs for database management systems. More specifically, this invention relates to a database definition language program generator which reads information from a structured file and uses this information to generate the appropriate database definition language program for a database management system (DBMS), such as Oracle® or DB2®.

2. Description of the Prior Art

The development of a database application program usually begins with the generation of a database design document. This document is produced by any combination of an application development team, a client, data modelers, Database Administrators (DBAs) and a system development team. The database design document generally contains information defining the organization of the database application program and includes definitions of the database, tablespace, table, columns and their attributes. For a complex database application program, for example an accounting, inventory control or personnel system, the database design document is complicated and can take many weeks or months to develop.

After the completion of the database design document, it is provided to one or more DBAs who are responsible for translating the design into a language provided by the DBMS. This language, a Database Definition Language (DDL), is used to define or describe the database objects and to define the structure and format of the database. It is general practice for the DBA to manually code the DDL using the database design document as a guide. Further information on the design of database management systems and the use of DDL may be had by reference to *An Introduction to Database Systems, Volume 1*, Third Edition, by C. J. Date, Addison-Wesley Publishing Co. (1982).

There is a great degree of skill required to generate the correct DDL code to create database objects for the implementation of an application. It is necessary for the DBA to understand the DBMS and to know the language and syntax of the DDL for the specific DBMS in use. In addition, since the DBA manually translates the design document into the proper DDL, there are often typographical errors, omissions or inconsistencies between the application as coded and the design document. These inconsistencies can lead to the communication of misinformation to the users and developers of the system. Often, these individuals rely on the database design document to obtain information regarding the design of the system and if the system does not accurately reflect this information other problems can arise. These problems can include errors in the coding of the systems application or in future design considerations. Furthermore, if there is more than one DBA who implements the design, as is the case with complex systems, different techniques or understandings can result in major implementation problems. Finally, since the database design document may not accurately reflect the application as implemented, the user or client would possibly be reviewing an incomplete or inaccurate view of the implementation.

Furthermore, during the design and implementation of complex systems, there are often many changes to the database design after the initial implementation by the DBA. This can result in wasted effort, since the DBA may be required to rewrite portions of the DDL code which is difficult and time-consuming.

At present, there are a large number of DBMSs which are in use or being developed. Therefore, a DBA is often required to utilize a new DBMS for the implementation of an application or to maintain applications which have been implemented in different DBMSs. This often results in the need for a DBA to become familiar with the DDL for each system. Although these systems can be similar, each has its own unique language and syntax for creating database objects. It is often necessary for the DBA to attend a training session or to study a manual in order to learn the DDL for a new system. This can be time consuming and/or expensive and result in delays in the implementation of the application. Furthermore, the initial efforts often contain errors or do not correctly implement the desired application design.

SUMMARY OF THE INVENTION

It is therefore an object of the present invention to provide a database definition language generator which generates from a document file the Database Definition Language code for the appropriate database management system.

It is another object of the present invention to provide a means to create a database application which is consistent with a database design document.

It is a further object of this invention to reduce the time required to code the DDL for a database application.

According to the invention, there is provided a database definition language generator which accepts input of a database design from a structured file and using this information generates the appropriate database definition language code for the DBMS which is specified. The structured file can be in the form of a database design document or can be information in any structured file format. The program reads the input file and, until the end of file indicator is reached, processes the statements based on their data types. The program can store default parameters which will be used in the appropriate fields if no data is specified.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention is preferably practiced in the context of a DBMS resident on a personal computer, a workstation, a minicomputer or a mainframe computer. A representative hardware environment is depicted in FIG. 1, which illustrates a typical hardware configuration having a Central Processing Unit (CPU) 10, such as a conventional microprocessor, and a number of other units interconnected via a system bus 12.

Figure 1:
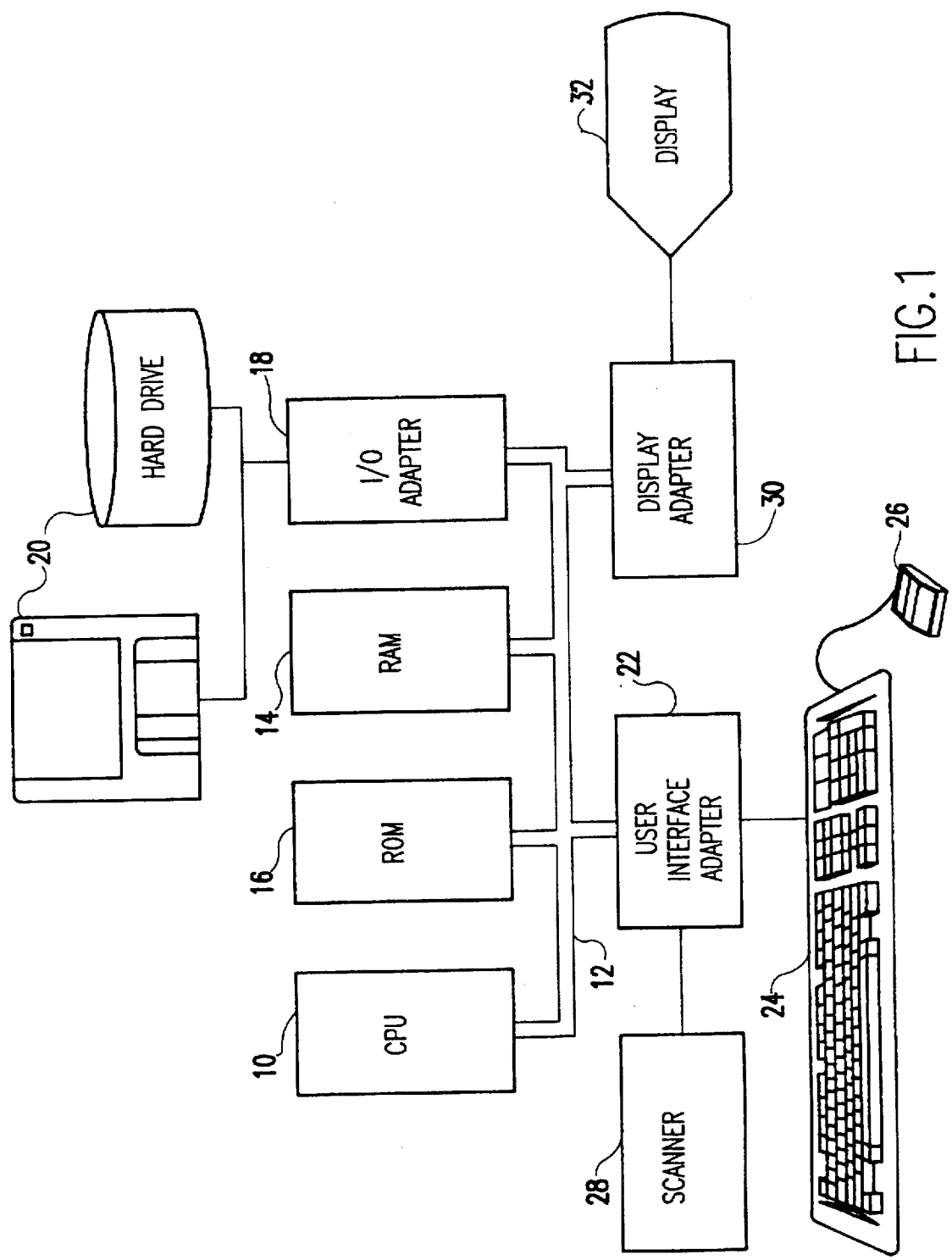
FIG. 1 is general diagram of a hardware configuration of a computer on which the invention can be used.

The configuration shown in FIG. 1 includes a Random Access Memory (RAM) 14, Read Only Memory (ROM) 16, an Input/Output (I/O) adapter 18 for connecting peripheral devices such as disk units 20 to the bus, a user interface adapter 22 for connecting a keyboard 24, a mouse 26, a scanner 28 and/or other user interface devices to the bus and a display adapter 30 for connecting the bus to a display device 32. One or more DBMS are included in the storage of the computer. In addition, the program of the present invention is stored on the hard disk of the computer.

Figure 2:
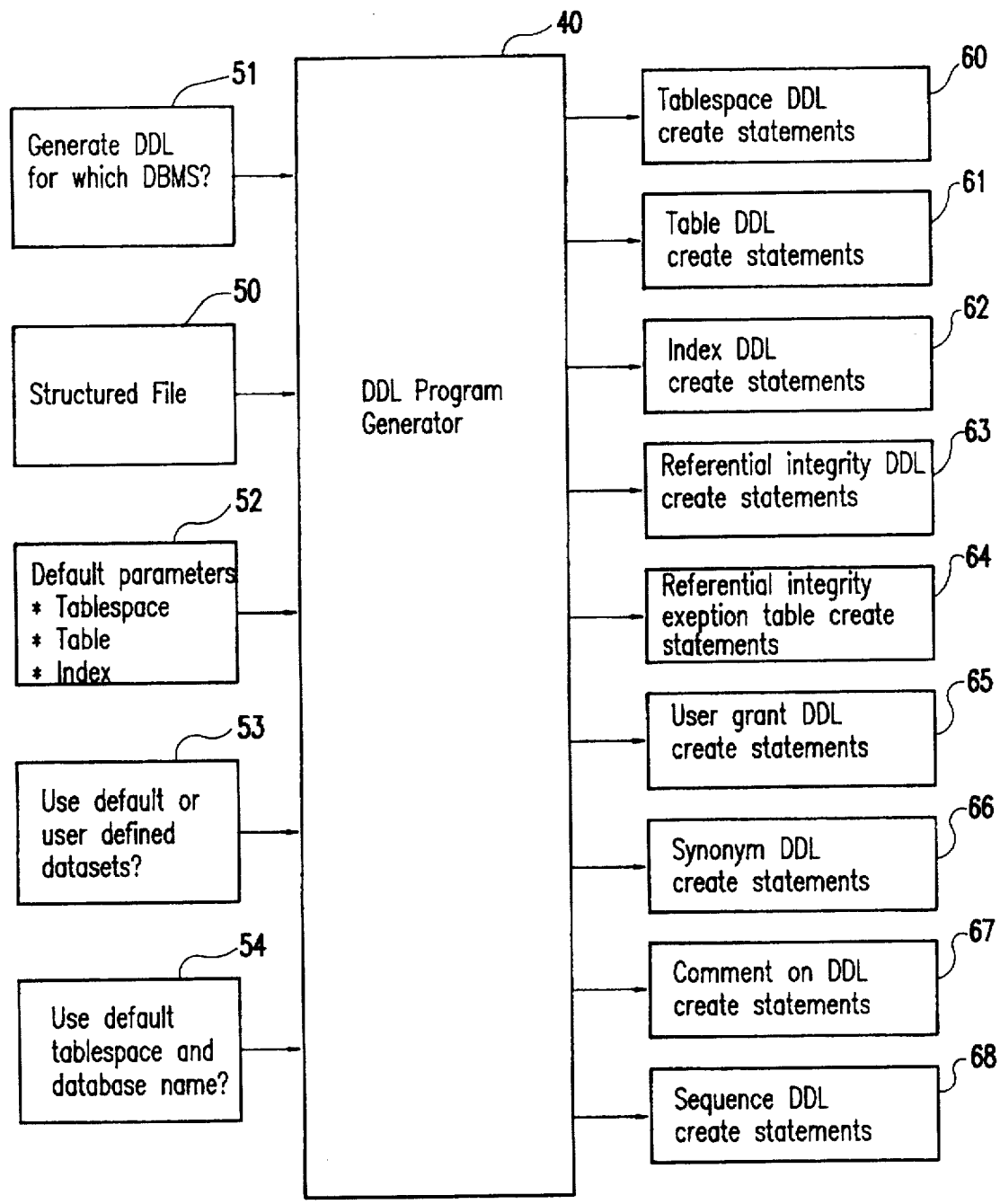
FIG. 2 is a functional block diagram of the inputs to and the outputs from the Database Definition Language generator.

The present invention, as shown in FIG. 2, is directed to a database definition language generator 40 which uses information from a structured file 50 which includes the standard table definition, and the DBMS to be used 51 to generate the appropriate Database Definition Language statements for the database objects. Other optional object definition information can be provided as input, including default parameters for tablespace, table and index 52, the specification of whether to use the DBMS or user defined datasets 53, and default names for tablespace and database 54. Some examples of the output objects which can be created are as follows: tablespace create statements 60, table create statements 61, index create statements 62, referential integrity clauses 63, referential integrity exception table create statements 64, user grant statements 65, synonym create statements 66, comment on statements 67, and sequence create statements 68. The database management system is preferably a relational database management system and in the preferred embodiment is the Oracle® DBMS or the DB2® DBMS. "Oracle" is a registered trademark of the Oracle Corporation, and "DB2" is a registered trademark of the International Business Machines Corporation. The structured input file 50 can be written in any application which allows the programmer to create a structured file. Some examples of these applications are Bookmaster, Script or other similar applications.

As discussed supra, the initial step in the development of an application using a DBMS requires the design and definition of the database objects. As discussed, the system design team will generally create a database design document which is used by a DBA to generate the code to define the database objects. This database design document can be used as input by the present invention. If the design document is generated in a compatible file format, it can be used directly as input. On the other hand, if a paper copy of the design document exists, the proper format can be achieved by scanning the document in. An example of the structured file input created using Bookmaster is shown below.

:tcap.Actions Table
:tdesc.OMIN.ACTIONS
:etdesc.
:thd.
:c.Column Name
:c.Size
:c.Default
:c.Type
:c.Comments
:ethd.
:row.
:c.DATE_OPENED
:c.4
:c.Required
:c.DATE
:c.
:row.
:c.ACTION_#
:c.2

-continued

:c.Required
:c.SMALLINT
:c.01 to 99
.
.
.
:row.
:C.
:tnote text=' '.
:p.
Length = 3874
:p.Indexes
:ol.
:li.DATE_OPENED + ACTION_# + SOURCE_BOARD (Unique)
:eol.
:etnote.
:etable.
:dl tsize=29
:dthd.Column Name
:ddhd.Element Description
:dt.DATE_OPENED
:dd.
Date the action item is opened
:edl.

As shown, each tag (lines which start with a colon) represents input to be used in the generation of the DDL. For example, on line 2, :tdesc.OMIN.ACTIONS is the authorization id and name of the table, on line 12, :c. DATE_OPENED is a column of the table and on line 13, :c.4 indicates that the column is four (4) bytes.

The present invention provides a means for reading a structured file similar to the one illustrated above in its entirety and generating the DDL code for all of the objects specified. There is no limit on the size of the input document file. The example input is only a sample of the types of input which can be accepted by the generator program. Other configurations of formatted data can be used; however, it is required that the data be in a structured format so that the program can recognize the different parameters and objects which are necessary to create the DDL code.

With reference back to FIG. 2, at least three other types of optional input information can be input into the data generator. If this information is not provided, either the default values specified by the user or those of the DBMS are used in the generation of the DDL code. The program can be easily modified to default to other criteria, as desired. The user can optionally specify default parameters for tablespaces, tables and indexes 52. Some of the default parameters which the user can enter for tablespaces or tables include: CLOSE, FREEPAGE, PCTFREE, LOCKSIZE, INITIAL, NEXT, and MINEXTENTS. In addition, the user can specify the following default parameters for indexes: CLOSE, FREEPAGE, PCTFREE, LOCKSIZE, CLUSTER, INITIAL, NEXT, and MAXEXTENTS. If necessary, the program will automatically generate DBMS parameters, such as PCTFREE, based on table statistics. If the user does not supply values for these variables, the standard defaults for the DBMS specified will be Used in the generation of the DDL code.

The user can also choose whether standard DBMS storage groups or user defined datasets will be used by the DDL generator. If no specification is made, the program uses a generic profile of IDCAMS parameters. In the case of the DB2® DBMS, the user can specify whether to use the DB2® Storage Groups or User Defined DB2® datasets which use IDCAMS.

Finally, the user has the option to enter the database and tablespace name for the application. If more than one tablespace exists in the application, the program will use the same tablespace name for each table object if no tablespace name is supplied with the table name. If the Oracle DBMS is used, the user will also have the option of entering a tablespace name for indexes as well as one for tablespaces. If no entry is made, the program will automatically generate a generic name for both the index and the tablespace name.

The database definition language program generator of the present invention processes the structured file input, as described supra, according to the data type of each record and then generates the appropriate DDL code for the DBMS specified. The DDL program generator can generate most of the DDL statements necessary for an application, as shown in FIG. 2. These DDL statements define and describe the structure of the database application. An example of the DDL statements which would be generated to create a table for use with a DB2® database is shown below.

| PROGRAM DDL CREATES FROM DB2 | | |
|---|---|---|
| CREATE TABLE OMIN.ACTIONS | ( | |
| DATE_OPENED | DATE | NOT NULL , |
| ACTION_# | SMALLINT | NOT NULL , |
| SOURCE_BOARD | CHAR(8 ) | NOT NULL , |
| ACTIONEE | CHAR(20 ) | NOT NULL WITH , DEFAULT |
| ORGANIZATION | CHAR(6 ) | NOT NULL WITH , DEFAULT |
| CO_ACTIONEE | CHAR(55 ) | NOT NULL WITH , DEFAULT |
| STATUS | CHAR(6 ) | NOT NULL , |
| DUE_DATE | DATE | , |
| DATE_CLOSED | DATE | , |
| CLOSURE_RATIONALE VARCHAR(1800 ) | | ) NOT NULL WITH DEFAULT |
| ) IN OMINDOMN. | | |

The above example shows the DDL statements for the creation of a table, OMIN.ACTIONS which has ten data fields. The names, format and requirements for each field are also specified. In addition to the information shown, the DDL program generator can produce other DDL statements as necessary, including those for referential integrity, referential integrity exception tables, tablespaces, indexes, and comments.

A further example of the DDL statements which can be generated using the present invention is shown below. This example would be for an application using the Oracle® DBMS.

| PROGRAM DDL CREATES FROM ORACLE | | |
|---|---|---|
| Table create statements | | |
| CREATE TABLE OMIN.ACTIONS | ( | |
| DATE_OPENED | DATE | NOT NULL , |
| ACTION_# | SMALLINT | NOT NULL , |
| SOURCE_BOARD | CHAR(8 ) | NOT NULL , |
| ACTIONEE | CHAR(20 ) | , |
| ORGANIZATION | CHAR(6 ) | , |
| CO_ACTIONEE | CHAR(55 ) | , |
| STATUS | CHAR(6 ) | NOT NULL , |
| DUE_DATE | DATE | , |
| DATE_CLOSED | DATE | , |
| CLOSURE_RATIONALE | VARCHAR | |
| ) | | |
| TABLESPACE | | |
| STORAGE (INITIAL NEXT MINEXTENTS 1 MAXEXTENTS 99 PCTINCREASE 0) | | |
| PCTFREE | | |
| PCTUSED | ; | |
| Index create statements | | |

| PROGRAM DDL CREATES FROM ORACLE | | |
|---|---|---|
| CREATE UNIQUE INDEX | IDX_ | ON OMIN.ACTIONS |
| DATE_OPENED | , | |
| ACTION_# | , | |
| SOURCE_BOARD | , | |
| ) | | |
| TABLESPACE | | |
| STORAGE (INITIAL NEXT MINEXTENTS 1 MAXEXTENTS 99 PCTINCREASE 0) | | |
| PCTFREE | | |
| NOSORT; | | |
| Synonym create statements | | |
| CREATE SYNONYM ACTIONS FOR OMIN.ACTIONS; | | |
| Grant statements | | |
| GRANT SELECT, INSERT, UPDATE, DELETE ON OMIN.ACTIONS TO PUBLIC; | | |

As shown, the DDL code has been generated for the creation of a table, OMIN.ACTIONS which has ten database fields. This is similar to the example shown previously using the DB2® DBMS. This example also shows the DDL code which would be generated to create indexed fields for the table. As illustrated, indexes would be created for the fields DATE_OPENED, ACTION_# and SOURCE_BOARD. There are also shown DDL statements which would create a synonym of ACTIONS for the table OMIN.ACTIONS and would grant the ability to perform specified actions on the table to all users (PUBLIC).

Figure 3:
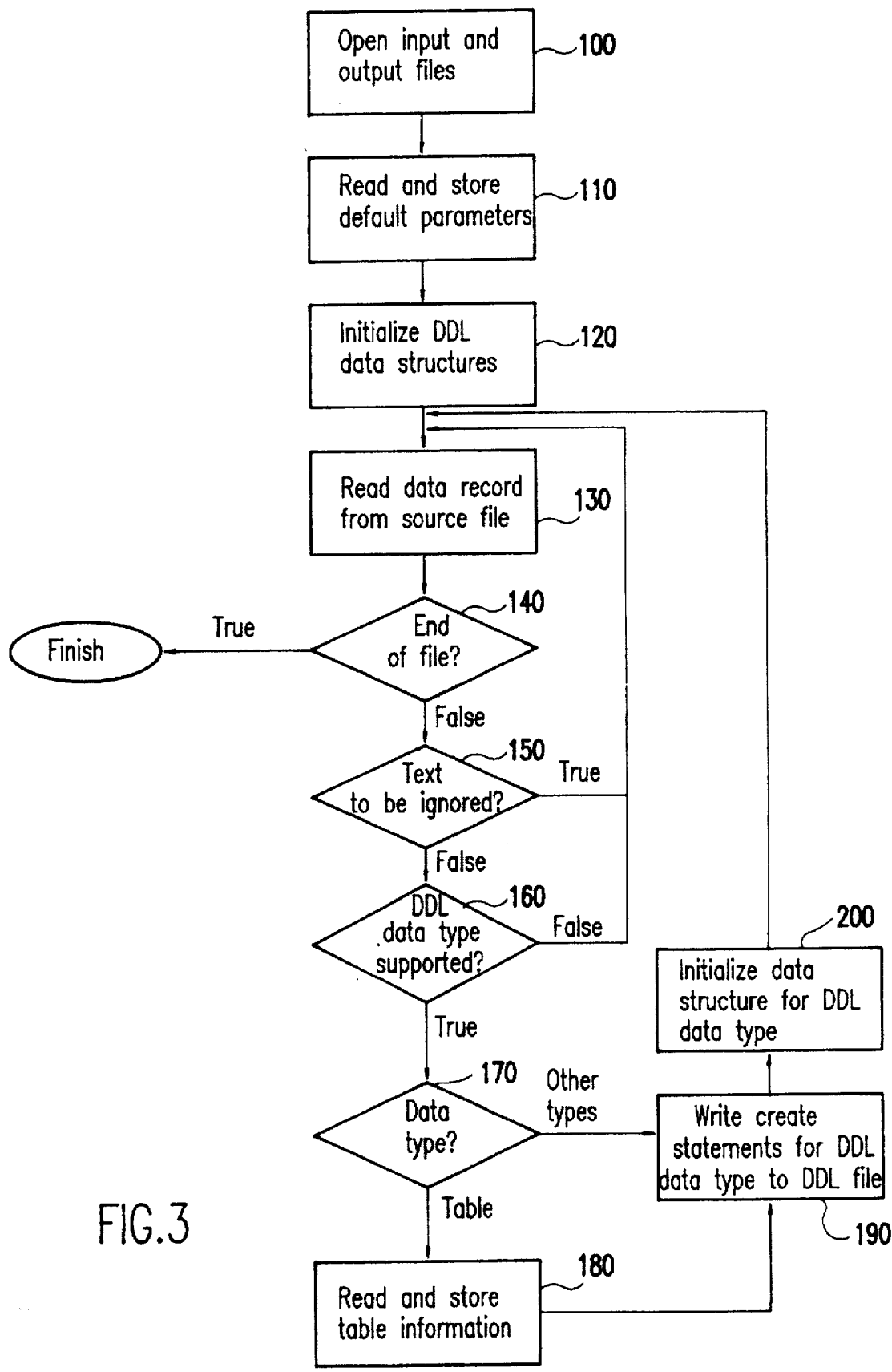
FIG. 3 is a flow diagram detailing the general logic of the DDL generation program using DB2®.

FIG. 3 is a flow diagram which details the program logic for the present invention. At block 100, the input file(s) and the output file(s) are opened. The input file contains the database design information and the output file will be written with the DDL code for the application. The DDL program generator then reads, from the input file, and stores, in variables, the default parameters which are to be used in instances where the information is not specified 110. Then, at block 120, the DDL data structures are initialized and the variables are reset. The program then reads the next data record in the source file 130. At block 140, the DDL program generator determines whether the end of the file has been reached. If so, the process terminates. If not, processing continues. The data line is then interpreted to determine if the data is a part of the DDL or if it is surrounding text which is to be ignored 150. If the data line does not contribute to the DDL, the DDL program generator returns to block 130 and reads the next line in the file. Otherwise, at block 160, it is determined whether the data type for the data read from the input file is supported by the DDL. The pseudocode for a DB2® database application for the evaluation of the data type is shown below.

```
Procedure : Main
.
.
.
if not end of file then
    when (storage group)   invoke read storage group DDL
                           write create storage group statement to
                               DDL file
                           invoke reset storage group DDL
    when (database)        invoke read database DDL
                           write create database statement to DDL
                               file
                           invoke reset database DDL
```

```
when (tablespace)      invoke read tablespace DDL
                       write create tablespace statement to DDL
                         file
                       invoke reset tablespace DDL
when (table)           invoke read table DDL
                       write create table statement to DDL file
                       write create index statements to DDL file
                       write comment on statements to DDL file
                       write create synonym statements to DDL
                         file
                       write create alias statements to DDL file
                       write grant statements to DDL file
                       invoke reset table DDL
    when (others)      issue message -- invalid DDL data type
end if
end main;
```

As can be seen, other data types can be easily defined depending on the DBMS in use. As shown, an invalid data type causes a message to be issued to notify the user and the program returns to block 130 to read the next data record. On the other hand, if the data type is found for the DDL, then, as shown above, a determination of the data type is made at block 170. Each data type invokes different procedures which read the records and generate the necessary DDL statements. If the data type is table, therefore specifying the creation of a table, then as indicated in block 180, the program will read and write all of the information for the creation of the table until the end of the table information is reached. In addition to creating the columns, other table information is specified including, for example, the primary key, referential integrity, and free space parameters. The following pseudo code provides an illustration of the procedure used to read the table information from the input file and generate the appropriate DDL statements.

```
Procedure : Read Table DDL
if not end of table information
    when (table name)       store table name
                            if tablespace name also provided then
                                store tablespace name
                            else
                                store default tablespace name
                            end if;
                            store synonym name
                            store alias name
                            store grant table name
    when (column name)      allocate node in list
                            adjust column pointers
                            store column name
    when (data type)        store column data type
    when (length)           store column length
    when (required/default) store column nullable indicator
    when (fieldproc)        store fieldproc
    when (fp parm list)     compress blanks from parameterlist
                            store field proc parameter list
    when (primary key)      validate key list
                              • column defined in table
                              • no duplicates
                              • defined as not null or not null
                                with default
                              • max 64 columns
                              • max combined length 254
                            allocate node in list
                            adjust pointers
                            store primary key column list
    when (unique)           validate unique column list
                              • column defined in table
                              • no duplicates
                              • defined as not null or not null
                                with default
                              • max 64 columns
                              • max combined length 254
                            allocate node in list
                            adjust pointers
                            store unique column list
    when (comment)          store table comment
    when (ref integrity)    allocate node in list
                            adjust pointers
                            store referential integrity constraint
                            set referential integrity flag
    when (index)            store index name
                            store index columns and
                                ascending/descending index in list
                            store index parameters
    when (end index)        if free space parameters not provided
                                compute index length
                                compute free space
                            end if
    when (end table)        if free space parameters not provided
                                compute table length
                                compute free space
                            end if
                            invoke Reset Table DDL Variables;
    when (others)           issue message -- invalid DDL data type
end Read Table DDL Variables;
```

The code provided above illustrates the logic of the program which has been implemented using the terminology for DB2® DBMS. It is understood that this program could be modified for other DBMSs. This code shows that for each type of statement specified in the structured data input file for the creation of a table, the information to generate one or more specified DDL statements is stored.

Referring back to FIG. 3, after the table information has been read and stored and for data types other than table, at block 190, the create statements for the DDL data type are written to the output file. At this point, the data structures are initialized for the corresponding DDL data type 200. Finally, the control returns to block 130, where another line of the file is read from the input file.

The DDL program generator provides a tool which enables a user with minimal knowledge of the DBMS language and required syntax to be able to implement the design of a database. In addition, since the input to the program is from a design document as input, individuals involved in the design who may not be familiar with the DBMS language would be able to review and easily comprehend the actual design of the database as it will be implemented. Moreover, the DDL program generator minimizes the work required by the database administrator when subsequent changes or corrections are made to the design document. Finally, database administrators can use the output generated to learn the language and syntax for a new DBMS.

While the invention has been described in terms of a single preferred embodiment, those skilled in the art will recognize that the invention can be practiced with modification within the spirit and scope of the appended claims.

We claim:

1. A database definition language program generator, comprising:

a source of user defined datasets;

a structured document file storing a database design, said structured document file being composed of a plurality of object records, including statements of different data types, wherein said structured document file includes default database management system parameters including tablespace name, table name, table and index information;

means for reading said structured document file one object record at a time;

processing means responsive to said means for reading, for processing each object record statement according to its data type, said processing means identifying said data type to generate database definition language statements for a specified database management system, wherein said database definition language statements include tablespace create statements, database definition language table create statements, and database definition language statements, said processing means optionally accessing said source of user defined datasets while processing each object record statement, said processing means further accessing a source of said default database management system parameters for processing said object record statements; and output means responsive to said processing means for generating a database application composed of said generated definition language statements.

2. A database definition language generator, as recited in claim 1, wherein said database management system is a relational database.

3. A computer implemented method of generating an application program in a database definition language of a database management system, comprising the steps of:

providing a source of user defined datasets;

creating a structured document file storing a database design, said structured document file being composed of a plurality of object records, including statements of different data types, wherein said structured document file includes default database management system parameters including tablespace name, table name, table and index information;

reading said structured document file one object record at a time;

processing each object record statement according to its data type, said processing including the identification of said data type in order to generate database definition language statements for a specified database management system, wherein said database definition language statements include tablespace create statements, database definition language table create statements, and database definition language statements, wherein said source of user defined datasets is optionally accessed while processing each object record statement, said processing means further accessing a source of said default database management system parameters for processing said object record statements; and output means responsive to said processing means for generating a database application composed of said generated definition language statements.

4. A method of generating database definition language, as recited in claim 3; wherein said database management system is a relational database.

* * * * *